United States Patent
Rogas

(10) Patent No.: US 10,592,922 B2
(45) Date of Patent: Mar. 17, 2020

(54) SYSTEM AND METHOD FOR DETECTING FRAUDULENT INTERNET TRAFFIC

(71) Applicant: NS8, Inc., Las Vegas, NV (US)

(72) Inventor: Adam Rogas, Las Vegas, NV (US)

(73) Assignee: NS8, Inc., Las Vegas, NV (US)

( * ) Notice: Subject to any disclaimer, the term of this patent is extended or adjusted under 35 U.S.C. 154(b) by 135 days.

(21) Appl. No.: 15/701,375

(22) Filed: Sep. 11, 2017

(65) Prior Publication Data

US 2018/0075478 A1 Mar. 15, 2018

Related U.S. Application Data

(60) Provisional application No. 62/385,894, filed on Sep. 9, 2016.

(51) Int. Cl.
*H04L 29/06* (2006.01)
*G06Q 30/02* (2012.01)
*H04L 29/12* (2006.01)

(52) U.S. Cl.
CPC ...... *G06Q 30/0248* (2013.01); *H04L 61/1511* (2013.01); *H04L 61/1552* (2013.01); *H04L 63/1416* (2013.01); *H04L 63/1425* (2013.01); *H04L 63/1483* (2013.01)

(58) Field of Classification Search
CPC ............ G06Q 30/0248; H04L 61/1511; H04L 61/1552; H04L 63/1416; H04L 63/1425; H04L 63/1483
See application file for complete search history.

(56) References Cited

U.S. PATENT DOCUMENTS

| | | | |
|---|---|---|---|
| 7,082,463 B1* | 7/2006 | Bradley | H04L 41/5003 709/223 |
| 7,467,192 B1* | 12/2008 | Lemler | H04L 41/5006 709/220 |
| 8,505,071 B2 | 8/2013 | Fritz et al. | |
| 9,071,576 B1* | 6/2015 | Earl | H04L 63/0236 |
| 9,118,680 B1* | 8/2015 | Dunlap | H04L 67/1008 |
| 9,582,802 B2 | 2/2017 | Bachenheimer et al. | |
| 9,906,544 B1 | 2/2018 | Kurupati | |
| 2006/0190603 A1* | 8/2006 | Anzai | H04L 12/2854 709/226 |
| 2008/0307085 A1* | 12/2008 | Curran | H04L 29/12066 709/223 |
| 2009/0055910 A1 | 2/2009 | Lee | |
| 2009/0094687 A1 | 4/2009 | Jastrebski et al. | |
| 2011/0153840 A1* | 6/2011 | Narayana | H04L 67/1029 709/227 |
| 2012/0254940 A1 | 10/2012 | Raper | |

(Continued)

*Primary Examiner* — Sarah Su
(74) *Attorney, Agent, or Firm* — Weide & Miller, Ltd.

(57) ABSTRACT

Systems and methods for identifying fraudulent Internet traffic are provided. A tracking script is provided that generates a unique URL encoding an IP address of a client device. In order to find an IP address associated with the unique URL, a request for the IP address associated with the unique URL is received at a DNS resolver server from a DNS server upstream from the client device. The IP address of the client device, the DNS server upstream from the client device and the DNS resolver server in a database are correlated to obtain information about the Internet traffic to determine the likelihood that the traffic is fraudulently generated.

15 Claims, 3 Drawing Sheets

(56) References Cited

U.S. PATENT DOCUMENTS

| | | |
|---|---|---|
| 2013/0007100 A1* | 1/2013 | Trahan .................... H04L 67/02 |
| | | 709/203 |
| 2013/0074169 A1 | 3/2013 | Nuzzi et al. |
| 2013/0159804 A1 | 6/2013 | Suzue et al. |
| 2013/0185143 A1 | 7/2013 | Damman |
| 2013/0198821 A1 | 8/2013 | Hitchcock et al. |
| 2013/0246187 A1 | 9/2013 | Chau et al. |
| 2013/0276125 A1 | 10/2013 | Bailey |
| 2014/0013389 A1 | 1/2014 | Han et al. |
| 2014/0137192 A1 | 5/2014 | Arroyo-Figueroa |
| 2014/0150095 A1* | 5/2014 | Zhao ....................... H04L 29/06 |
| | | 726/22 |
| 2014/0236695 A1 | 8/2014 | Shvarts et al. |
| 2014/0331283 A1 | 11/2014 | Stein et al. |
| 2014/0349692 A1 | 11/2014 | Zhou et al. |
| 2014/0359730 A1 | 12/2014 | Hang et al. |
| 2014/0380418 A1 | 12/2014 | Wang |
| 2015/0082460 A1 | 3/2015 | Amiga |
| 2015/0215334 A1* | 7/2015 | Bingham ................ G06N 20/00 |
| | | 726/23 |
| 2015/0220928 A1 | 8/2015 | Allen |
| 2015/0269380 A1 | 9/2015 | Golovanov |
| 2015/0276421 A1 | 10/2015 | Beaurepaire et al. |
| 2016/0078446 A1 | 3/2016 | Trostle |
| 2016/0086183 A1 | 3/2016 | Roberts et al. |
| 2016/0119279 A1* | 4/2016 | Maslak ................ H04L 61/1511 |
| | | 709/223 |
| 2016/0119304 A1 | 4/2016 | Lelcuk et al. |
| 2016/0197898 A1* | 7/2016 | Hozza ................. H04L 63/0442 |
| | | 713/168 |
| 2016/0352680 A1* | 12/2016 | Elsharif ............... H04L 61/1552 |
| 2017/0013044 A1* | 1/2017 | Gervasiychuk ........ G06F 21/566 |
| 2017/0046706 A1 | 2/2017 | Agarwal |
| 2017/0076292 A1 | 3/2017 | Schmitz |
| 2017/0366576 A1* | 12/2017 | Donahue ............... H04L 43/062 |
| 2017/0372219 A1 | 12/2017 | Crawford et al. |
| 2017/0372256 A1 | 12/2017 | Kantor et al. |
| 2018/0019968 A1* | 1/2018 | Redekop ................ H04L 47/70 |
| 2018/0108015 A1* | 4/2018 | Rogas ................. H04L 61/1511 |
| 2018/0270161 A1* | 9/2018 | Popescu .............. H04L 43/106 |

\* cited by examiner

SYSTEM AND METHOD FOR DETECTING FRAUDULENT INTERNET TRAFFIC

CROSS-REFERENCE TO RELATED APPLICATION

This application claims priority to U.S. Provisional Application No. 62/385,894 which was filed on Sep. 9, 2016, the contents of which are hereby incorporated by reference.

BACKGROUND

1. Field

The disclosed embodiments relate to Internet traffic. More specifically, the disclosed embodiments relate to mapping infrastructure of Internet traffic.

2. Related Art

The ability of various websites to attract advertising revenue is based largely on Internet traffic, where traffic is defined as Internet users accessing a web site or requesting content). Website publishers strive to develop the most relevant and interesting content to attract and drive traffic to their sites. The more traffic that a website has, the more advertising revenue the website can generate based on more page requests or click-throughs for a given advertisement. Websites that drive a high amount of Internet traffic may charge more for advertising space on the website. Additionally, advertising algorithms that determine ad placement across several websites may target placement on sites with a high amount of web traffic.

The above-described online advertising environment thus creates a premium on web traffic. This has led to an unfortunate rise in fraudulent web traffic. Fraudulent web traffic may be generated from a variety of sources including through redirects, hidden or embedded web pages, and botnets including computers dedicated to fraudulent activities and/or computers infected by malware. Fraudsters may use this fraudulent traffic to drive more advertising on their sites (or on websites of those buying the traffic from the fraudsters) and to collect revenue for advertisement requests or click-throughs.

For example, much of online advertisement placement is determined automatically based on Internet traffic analytics. In other words, advertisement placement is increasingly being determined via software algorithms instead of face-to-face negotiations between an advertiser and a website operator. Thus, fraudulent traffic may be utilized by some websites to gain more advertisement placements, even though the Internet traffic on their website is non-human in nature.

Additionally, the Internet increasingly facilitates more and transactions between parties. Trust in these transactions often depends at least in part on knowing a location of a user requesting the transaction. Typically, locations are determined by mapping databases or files that connect an IP address to the last known longitude and latitude of the IP address. However, such files may become quickly outdated. Further, these techniques may be circumvented by several technologies such as virtual private networks ("VPN") or Tor that enable a user to masquerade his or her true location.

SUMMARY

Considering the above, many institutions that conduct online transactions such as advertisers or online merchants are becoming more and more concerned with detecting fraudulent web traffic. This helps online users to have an increase in confidence when deciding to allow a transaction between computers, such as to ensure that online advertising is being displayed to real people, and more particularly to a specific target audience. The disclosed embodiments have been developed in light of the above problems. Accordingly, aspects of the invention may include a system for detecting fraudulent Internet traffic by providing a tracking script to content delivered to client devices via a content provider server. The tracking script, when executed, may generate a globally unique URL incorporating a random number and an IP address of a client device requesting content. An authoritative DNS resolver server may then receive a request from a topmost upstream DNS server for an IP address corresponding to the unique URL. With the unique URL and the request from the upstream DNS server, the DNS resolver server may correlate the client device requesting content with the upstream DNS server.

The system may then determine whether fraudulent Internet traffic exists based on patterns in the correlations between client devices and upstream DNS servers. The correlations may be compared with other known methods to detect botnets and other fraudulent Internet traffic to determine the validity of Internet traffic requesting particular content.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

In the following description, embodiments of a system and method of detecting fraudulent Internet traffic are disclosed. The embodiments are illustrative, and do not limit the scope of the invention.

Typically, it is difficult, if not impossible to determine what infrastructure is supporting a connection beyond basic information such as the IP address of the connection. As such, it is difficult to learn anything about the nature or patterns of Internet traffic visiting a particular website or requesting particular content on a website. The disclosed embodiments, allow advertisers, online merchants, law enforcement, or other interested parties to discern the quality of Internet traffic based on generating a map of the supporting infrastructure of the various connections of Internet traffic on a given website. Where there is shared infrastructure, collusion can be detected. Further, computers can be related to one another based on shared infrastructure to determine the possible presence of botnets.

Figure 1:
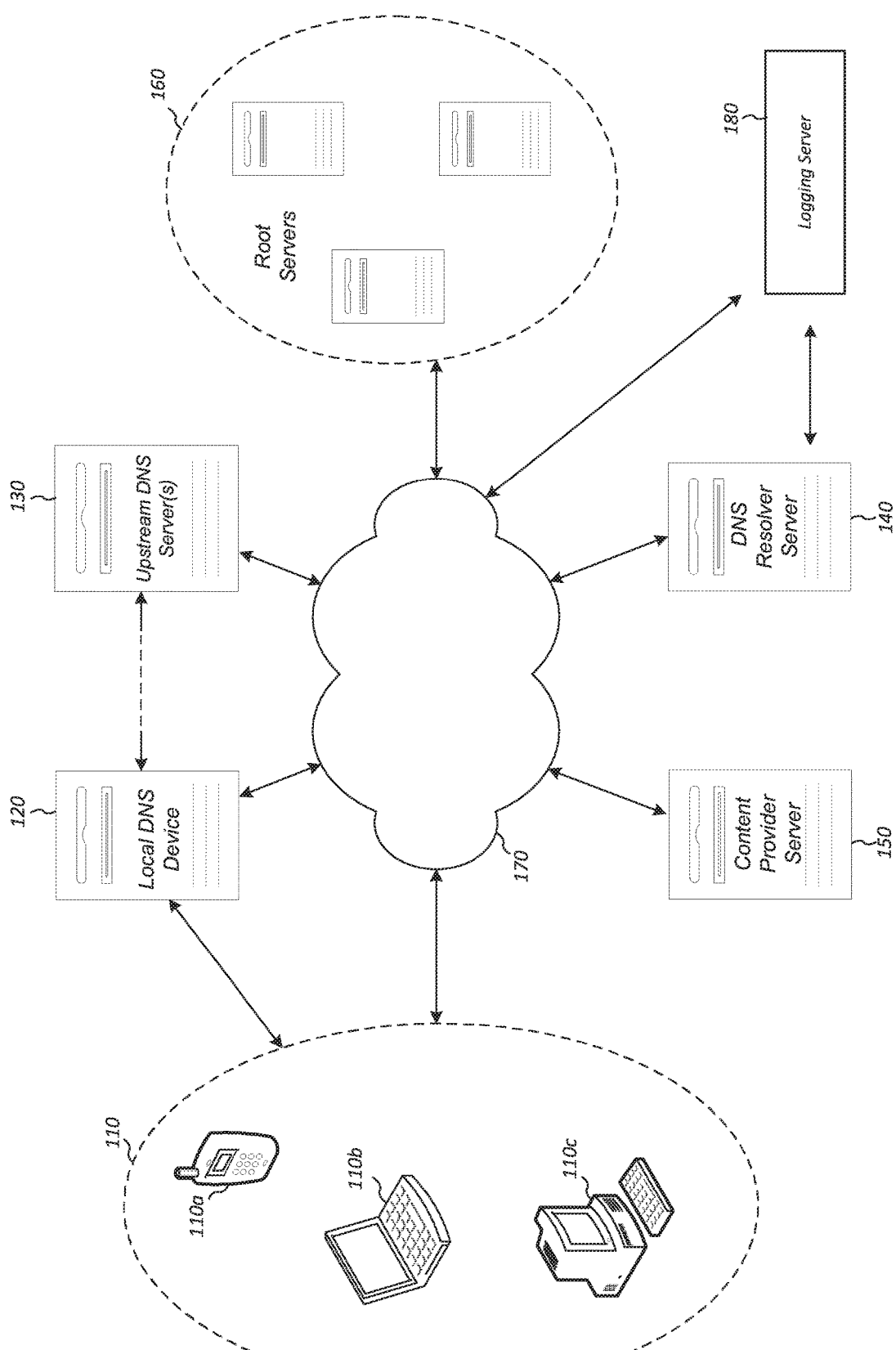
FIG. 1 shows an exemplary infrastructure for a system for detecting fraudulent Internet traffic, according to one embodiment of the invention.

FIG. 1 shows an exemplary infrastructure for a system for detecting fraudulent Internet traffic according to one embodiment of the invention. The infrastructure includes a plurality of client devices 110 such as mobile phones or other mobile devices 110*a*, laptops 110*b*, desktops 110*c*, or other similar devices. The client devices 110 may connect to the Internet via an Internet Service Provider ("ISP"). To find content on the Internet for a given domain name or URL, clients 110 are connected to a local Domain Name Service ("DNS") device 120. This device may be a server provided by an ISP. As is known, the DNS device 120 essentially translates a URL into an IP address for a client device 110 to determine the location of desired content on the Internet.

The local DNS device 120 typically caches IP addresses for URLs. However, when an IP address for a URL is unknown at the local DNS device 120, the local DNS device 120 sends a request to upstream DNS servers 130 to determine the URL location. There may be multiple upstream DNS servers 130 with the request may ultimately ending up with a topmost upstream or authoritative DNS server 130 when the IP address of the URL location is unknown. When a URL location is unknown, the upstream DNS server 130 sends requests to root servers 160 to determine what authoritative DNS server(s) can provide the location of the unknown URL. The root servers 160 direct the upstream DNS server 130 to appropriate other DNS servers to resolve the location of a requested URL by contacting the other DNS servers associated with one or more of the domain names of the unknown URL. When the correct IP address is found for the URL, the upstream DNS server 130 returns the IP address to the local DNS device 120 which in turn provides the IP address of the unknown URL to the client 110.

The infrastructure further incorporates an authoritative DNS resolver server 140 that is associated with a particular domain name. As will be explained in more detail below, when a topmost upstream DNS server 130 is directed from a root server 160 to find an IP address of an unknown URL with a domain name associated with the authoritative DNS resolver server 140, the upstream DNS server 130 sends an IP address request to the DNS resolver server 140 for the IP address of the unknown URL. The DNS resolver server 140 then provides the IP address of the content for the URL to the upstream DNS server 130.

In one embodiment, the DNS resolver server 140 is also configured to map infrastructure of the client devices 110, and to rate a connection or traffic from the client devices, as will be discussed in more detail below. The DNS resolver server 140 is also in communication with a content provider server 150 that provides content to a client device 110 via a network 170 such as the Internet. The content provider server 150 may also conduct data analysis based on information received from the DNS resolver server 150. The DNS resolver server 140 may provide a tracking script or code to be included or embedded within the IP address request, the content, or other request or exchange made available by the content provider server 150. Alternatively, the tracking script may be obtained from the content server 150 or from another external device.

It is noted that the authoritative DNS resolver server 140 may comprise a plurality of servers located at different geographic locations. The DNS resolver servers 140 may be configured to use anycast routing. In this manner, DNS resolver servers 140 at different locations may all answer to the same address based on which server is closest from a network connection perspective. Anycast routing is a network addressing and routing methodology in which data from a single sender is routed to the topologically nearest node in a group of potential receivers, though it may be sent to several nodes, all identified by the same destination address.

A logging server 180 is connected to the DNS resolver servers 140 via a network 170, such as the Internet. The logging server may collect information from the various DNS resolver servers to correlate data to rate Internet traffic in order to identify fraudulent traffic, as will be described in more detail below.

Figure 2:
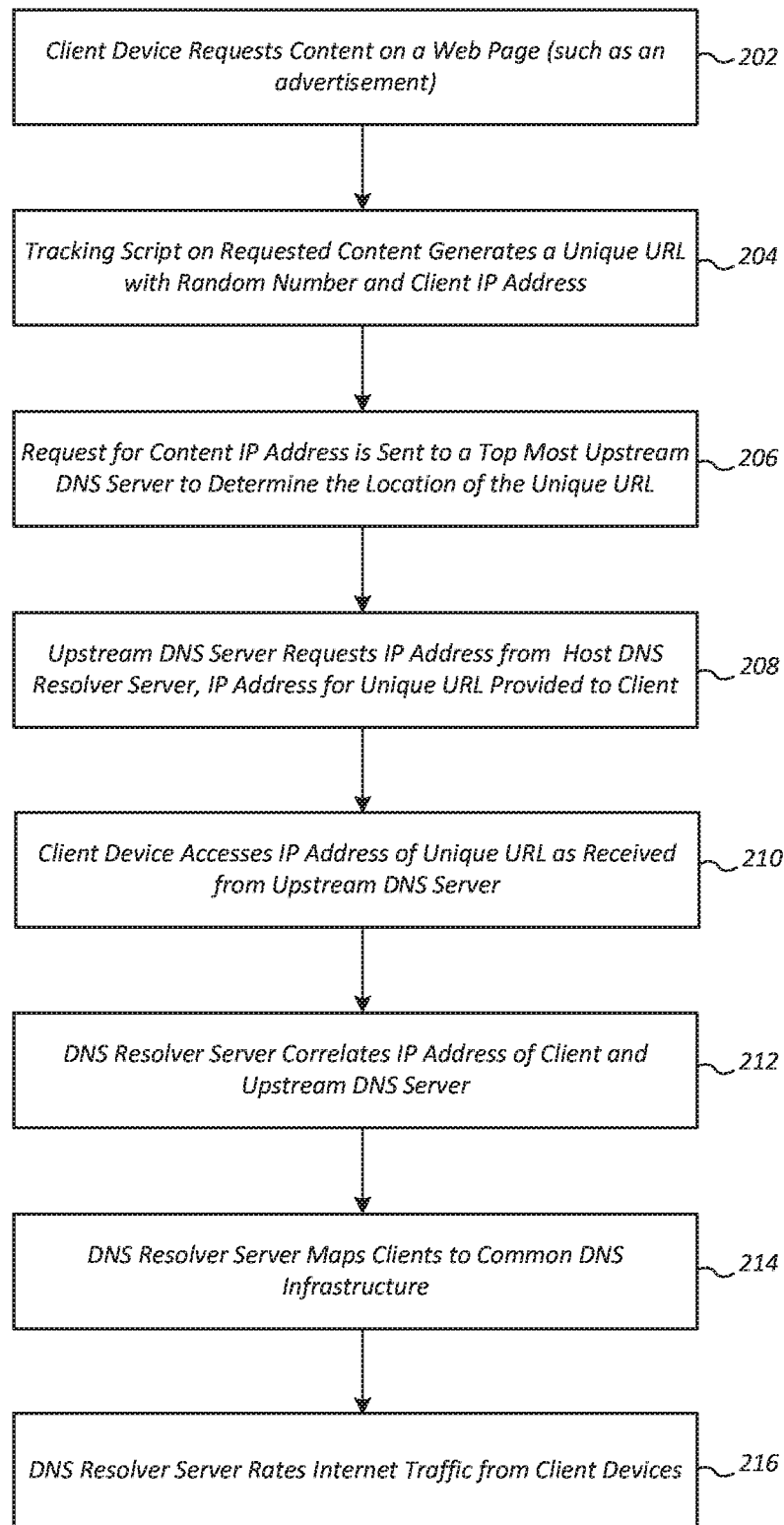
FIG. 2 shows an exemplary process of detecting fraudulent Internet traffic, according to one embodiment.
Figure 3:
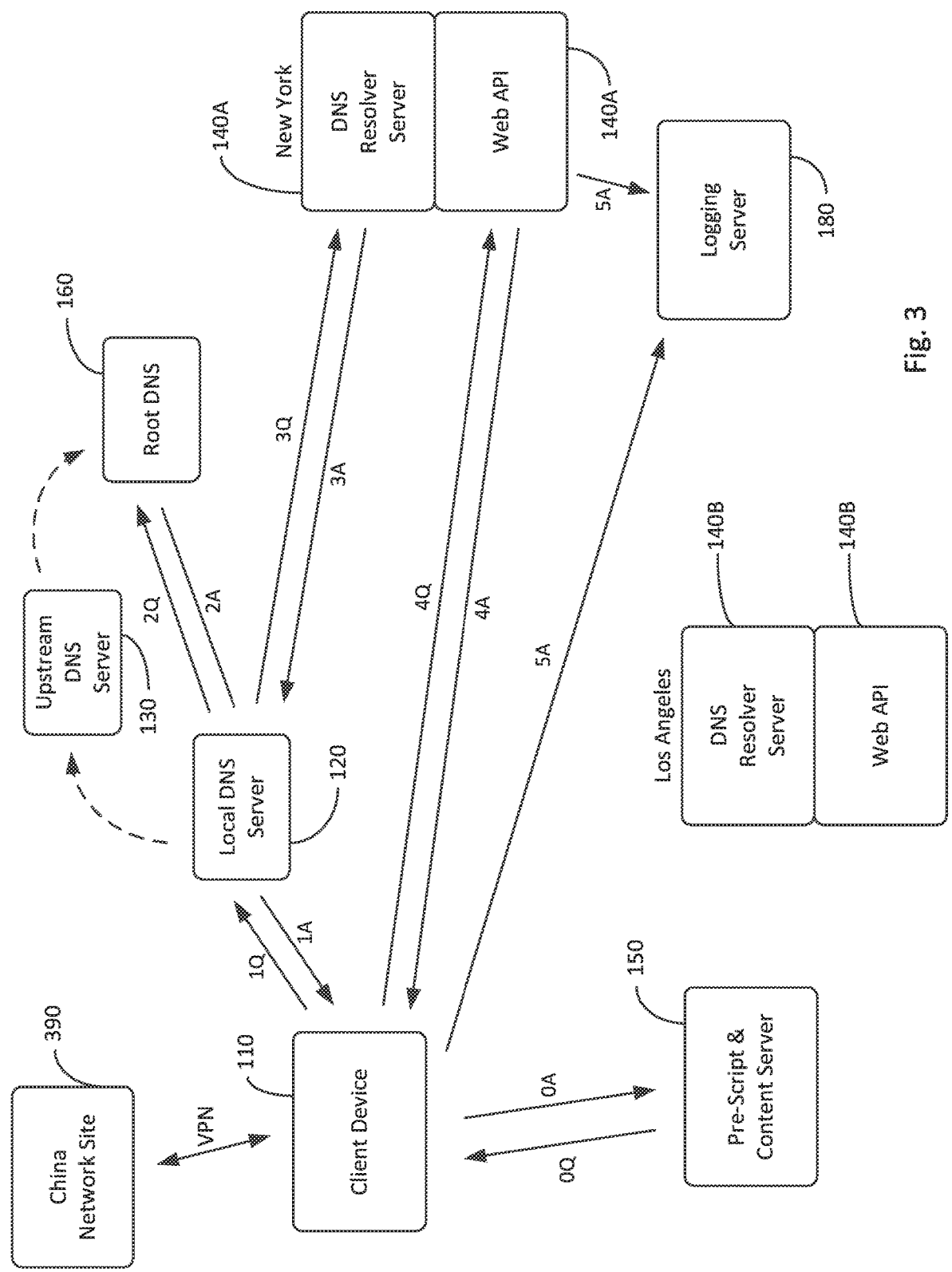
FIG. 3 shows a sequence of communications in an exemplary infrastructure for detecting fraudulent Internet traffic, according to one embodiment.

FIG. 2 shows an exemplary process of detecting fraudulent Internet traffic according to one embodiment. The process may be implemented on the infrastructure shown in FIG. 1 as described above, or any similar Internet or networking infrastructure now known or later developed. FIG. 3 shows a sequence of communications using the infrastructure shown in FIG. 1.

In step 202, a client device 110 requests content on a web page. This is shown in one example as communications 0Q and 0A in FIG. 3. The content may include a request for multimedia such as an image or video, a request to conduct an online transaction, or for an advertisement such as a banner ad, link, or other form of online advertising. The client device 110 requests content based on code such as HTML, Javascript, or other code embedded on a web page via a web browser or other web based application. In one example, the client device 110 requests content stored on a content provider server 150 and receives content from the server 150.

In one embodiment, the code or script for the requested content includes a tracking script. The tracking script is described above and herein as being used to track the request and to map the network paths for the request. In step 204, the tracking script on the requested content is executed on a client device 110 web browsing application and generates a globally unique signature encoding the current client device 110 IP address, a time stamp, a unique key, and/or other information that will be used to gain insight into the web traffic generated by the client device. The generated signature is used to create a globally unique URL. This unique URL may thus incorporate, for example, a randomly generated number with the IP address of the client device 110 requesting the content. Other information may also be included such as a timestamp from the browser or web-based application of the client device 110 at the time the request is made to a local DNS server 120.

Because this URL is generated to be a unique URL, the location of the IP address that corresponds to the unique URL is unknown to the client device 110. Similarly, because the URL is uniquely generated, a local DNS device 120 does not have a cached IP address location for the generated URL. That is, the globally unique URL (based on client device IP and unique key (code)) has ultimately been configured at the root servers 160 of the Internet 170 (or a higher-level server) to point to the authoritative DNS resolver server 140.

To determine the IP address of the URL in the tracking script, the local DNS device 120 sends a request through one or more upstream DNS servers to the authoritative upstream DNS server 130 to determine the IP address of the unique URL in step 206. This is shown as communication 1Q in FIG. 3. As explained above, because the URL is globally unique, the authoritative DNS server 130 queries a root server 160 to determine which server can provide the IP address for the unique URL. This is shown as communication 2Q. The root server 160 points the upstream DNS server 130 to the DNS resolver server 140. The DNS resolver server 140 may be one of a plurality of servers 140 that is accessed using anycast protocol as described above.

In step 208, the upstream DNS server 130 that received the request for the unique URL requests the IP address of the unique URL from the DNS resolver server 140. This is shown as communication 3Q. The DNS resolver server 140 identifies the upstream DNS server 130 from which the request was received, including the IP address of the upstream DNS server 130. The DNS resolver server 140 provides the IP address of the unique URL, to the upstream DNS server 130. This is communication 3A in FIG. 3. The IP address for the requested content is then sent back the client device 110 via the upstream DNS server 130. This is communication 1A in FIG. 3.

Because the unique URL delivered in the IP address request to the DNS resolver server 140 includes the unique signature encoded in the URL, the DNS server 140 decodes the URL revealing the signature including the unique key, a time stamp, and the IP address of the requesting client device 110. Further, because the DNS resolver server 140 obtains the IP address of the upstream DNS 130 server making the request for the location of the content, the DNS resolver server 140 may correlate client devices 110 to upstream DNS servers 130 in step 210. Additionally, because the DNS resolver server 140 may be a plurality of servers utilizing anycast routing, the network location of the upstream DNS server 130 may be determined by the location of the DNS resolver server 140 receiving the request. In the Example in FIG. 3, communication 3Q was sent to resolver server 140A in New York rather than DNS resolver server 140B in Los Angeles based on anycast routing. In this manner, the DNS resolver server 140 may relate a client device 110 to upstream infrastructure, that is, the upstream DNS server 130. Accordingly, network map data is created based on requesting entities or devices.

It is also noted that while it is described above that the DNS resolver server 140 may conduct the analysis of the IP address requests for the generated unique URL, the embodiments are not limited to this. Data from the requests received at the DNS resolver server 140 (which may include a plurality of servers using anycast routing) may be sent to a logging database, such as the database 180 or to some other server or database. The analysis, including the decoding of the unique URL, may then be conducted via data collected at the logging database. This is shown as communication 5A in FIG. 3.

In step 210, the client device 110 upon receiving the IP address for the unique URL, makes a request directed to the received IP address. In this embodiment, the received IP address is the DNS resolver server 140. The tracking script, for example, may instruct the client device 110 to contact the DNS resolver server 140. Upon receiving the request from the client device 110, the DNS resolver server 140 may log the IP address and a time stamp and transmit the data to the logging database 180. These communications are shown in FIGS. 3 as 4Q and 4A. The script may also instruct the client device to send a result of communication 4A to the logging server 5A to collect additional data.

As multiple requests for the IP address of unique URLs from various client devices 110 are made, the DNS resolver server 140 can correlate multiple client devices 110 with various upstream DNS servers 130, as outlined in step 212. With these correlations, the DNS resolver server 140 can map the client devices 110 to the various upstream DNS servers 130, as shown in step 214.

With the ability to map or identify requesting devices, the infrastructure of requesting client devices, as well as the validity or invalidity of Internet traffic can be assessed, and a rating for the internet traffic from client devices 110 may be rated, as in step 216. For example, client devices 110 can be correlated with one another and therefore be correlated to known bad IP addresses, indicating the presence of a botnet. Further, distinct or similar patterns that establish repeat traffic coming from a certain infrastructure may also suggest the presence of a botnet driving Internet traffic. For example, a user may request content 1 to 10 times during a given time interval, but 1000 requests during the time interval for content from a single device or IP address is indicative of fraudulent advertising access or fraudulent web site hits. The rating may indicate a percentage or likelihood that the Internet traffic is fraudulent.

In another example, time stamps from a request for an IP address for the unique URL may be compared with the time stamp received from the client device 110 from the resulting direct request. The difference between the time stamps may be compared to an expected difference based on a reported location of the IP address. This can help detect fraudulent Internet traffic by identifying client devices being operated from locations that are likely different than reported locations. This can help detect the presence of client devices being operated by a virtual private network and to estimate a location of the control device 390 operating through the virtual private network. For instance, the IP address of the client device 110 and anycast routing to a DNS resolver server 140 may indicate that the client device 110 is located proximate to New York. The DNS resolver server may then compare a time of the communication between the client device 110 to the DNS resolver server 140 to an expected time based on the reported location proximate to New York. If the time does not match the expected time, then it may be determined that there is a virtual private network and control of the device from outside New York. The farther the distance outside an expected distance, the more likely a traffic rating shows as fraudulent.

The correlations obtained may be combined with other data obtained to detect fraudulent Internet traffic, malware, and the like that are now known and may be later developed. Steps may be taken to disable access from the requesting devices determined to be fraudulent or bot sites or content providers may specify that they will not provide payment for access from these sites or devices.

The script may require other tests based on a rating of the DNS resolver server 140. For example, if a rating denotes that the Internet traffic is suspicious, the DNS resolver server may send instructions to access specific DNS resolver servers simultaneously, in order to gain information of the location of the client device 110. Other follow up checks may be conducted to determine a final rating of the internet traffic.

In some embodiments, the tracking script may be run together with the content delivery. In other embodiments, the tracking script may run as a side process independent of the content delivery. For example, a script for requesting content from the content server 150 may simultaneously provide the multimedia, advertising, or other content to the user device via a known or cached IP address while also generating the unique URL. The content for the unique URL runs in the background, for example, in a hidden frame of a webpage. In this manner, the client device 110 may quickly retrieve the content to display on a web page, while the DNS resolver server 140 is still able to track the IP address of the client device 110 and correlate the same with the IP address of the upstream DNS server.

Stated another way, or in an alternative embodiment, the executable tracking routine is delivered alongside the content that is to be protected from fraudulent access (access which is not by a live user, but by a bot or automated system) from an ad server either directly or via another ad server.

Once delivered and from within the user's browser the tracking routine executes and generates a globally unique signature and encoding of the current client's IP address and uses that signature to create a globally unique URL that has ultimately been configured at the root servers of the Internet to point to a specialized DNS resolver server. This process generally occurs via recursion through several upstream DNS servers from the client. DNS servers are configured to respond based on either information from a parent server or information from the root servers. When the request gets to the top most server, that is the server that is configured to ask the root servers, the root servers tell the requesting server that the only server that has the answer to the question (address information) it is seeking are the specialized DNS resolver servers and are associated with or in communication with the system that generated the unique address. These specialized DNS resolver servers can be placed at multiple data centers around the world or at a single location. The top most DNS server in the chain then takes this information and directly queries the authoritative DNS server, which may also be referred to as a specialized DNS resolver server.

In one embodiment, the specialized DNS resolver servers are configured to use anycast routing which means that there are multiple servers in multiple places that all answer to the same address. The anycast routing ensures that the server that is closest to a network connection perspective is the server that receives the connection. Information about which of the specialized DNS resolver servers ultimately receives the resolution request is factored into the data collection and analysis process.

After the top most DNS server queries the specialized DNS resolver server for the information, the specialized DNS resolver server decodes the URL revealing the signature that the executable routine had created, this includes a unique key and the original client's IP address. That information is then paired with the location of the specialized DNS resolver server that has received the request and reports back to a data analysis server(s). The data analysis server(s) then records this information and uses it to form decisions as to the validity of future inbound transaction or advertising requests via that server. This may indicate fraud if a high number of requests all arrive from the same requesting entity or the timing of such request could not be executed by a human.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for detecting fraudulent Internet traffic, the method comprising:
   providing a tracking script that generates a unique URL;
   receiving a request for an IP address associated with the unique URL at a DNS resolver server from a DNS server upstream from a requesting client device;
   correlating the requesting client device, the DNS server upstream from the requesting client device and the DNS resolver server in a database;
   receiving a communication from the requesting client device; and
   comparing an expected communication time based on the geographic location of the DNS resolver server and an actual communication time.

2. The method according to claim 1, wherein the tracking script encodes a client IP address of the requesting client device into the unique URL, and the client IP address is correlated with the DNS resolver server in the database.

3. The method according to claim 1, further comprising tracking a number of the received requests at the DNS resolver server from the requesting client device.

4. The method of claim 3, further comprising determining that traffic from the requesting client device is fraudulent when the number of the received requests exceeds a predetermined amount in a predetermined time interval.

5. The method according to claim 1, wherein the DNS resolver server is one of a plurality of DNS resolver servers with a same anycast destination address.

6. The method according to claim 5, wherein information received at the plurality of DNS resolver servers is stored on a logging server.

7. The method according to claim 1, wherein Internet traffic generated from the requesting client device is mapped based on a geographic location of the upstream DNS server and a geographic location of the DNS resolver server.

8. The method according to claim 1, further comprising rating Internet traffic generated from the client device with a fraudulence likelihood.

9. A system for detecting fraudulent Internet traffic, the system comprising:
   a DNS resolver server that is configured to receive a unique URL generated from a tracking script running on a website which is accessed by a client device requesting content;
   the DNS resolver server receiving the unique URL in a request from an upstream DNS server for an IP address corresponding to the unique URL, the DNS resolver server correlating the client device to a geographic location of the upstream DNS server,
   wherein the DNS resolver server receives a communication from the client device and compares an expected communication time based on a reported geographic location of the client device and an actual communication time.

10. The system of claim 9, wherein the DNS resolver server tracks a number of the received requests at the DNS resolver server from the client device.

11. The system of claim 10, wherein the DNS resolver server flags traffic from the client device as fraudulent when the number of the received requests exceeds a predetermined amount in a predetermined time interval.

12. The system of claim 9, wherein the DNS resolver server is one of a plurality of DNS resolver servers with a same anycast destination address.

13. The system of claim 12 further comprising a logging server, wherein information received at the plurality of DNS resolver servers is stored on the logging server.

14. The system of claim 9, wherein Internet traffic generated from the client device is mapped based on the geographic location of the upstream DNS server and a geographic location of the DNS resolver server.

15. The system of claim 9, wherein the Internet traffic generated from the client device is rated with a fraudulence likelihood.

* * * * *